United States Patent

Blasiole

[11] Patent Number: 5,845,591
[45] Date of Patent: Dec. 8, 1998

[54] BRANCH PIPE FOR A ROTARY COMBUSTOR

[75] Inventor: George A. Blasiole, Greensburg, Pa.

[73] Assignee: Westinghouse Electric Corporation, Pittsburgh, Pa.

[21] Appl. No.: 694,086

[22] Filed: Aug. 8, 1996

[51] Int. Cl.[6] ....................................................... F23B 7/00
[52] U.S. Cl. ........................... 110/234; 110/246; 122/11; 122/235.15
[58] Field of Search ..................... 122/11, 12, 235.15, 122/106, 108; 110/246, 234; 432/116, 118

[56] References Cited

U.S. PATENT DOCUMENTS

| | | |
|---|---|---|
| 3,859,039 | 1/1975 | Heinemann et al. . |
| 4,096,757 | 6/1978 | Ishii et al. . |
| 4,131,418 | 12/1978 | Kramm et al. . |
| 4,165,615 | 8/1979 | Morcov ................................. 122/11 X |
| 4,711,297 | 12/1987 | Haacker et al. . |
| 4,735,157 | 4/1988 | Jurusz ..................................... 110/246 |
| 4,840,132 | 6/1989 | Jose . |
| 4,934,744 | 6/1990 | Samera, Jr. et al. . |
| 4,966,746 | 10/1990 | Richardson et al. . |
| 4,972,786 | 11/1990 | Blasiole ................................. 110/246 |
| 4,995,809 | 2/1991 | Filges et al. . |
| 5,097,773 | 3/1992 | Freeman . |
| 5,590,610 | 1/1997 | Sanbonmatsu .......................... 110/234 |

Primary Examiner—Henry A. Bennett
Assistant Examiner—Susanne C. Tinker

[57] ABSTRACT

A rotary combustor is disclosed in which a plurality of tubes connect a first header to a second header, and in which the first and second headers have a plurality of baffles dividing them into a plurality of chambers. In accordance with the invention, a branch pipe is located at the extreme end of a first of the chambers for admitting fluid to the first chamber, such that the fluid flows through a first set of tubes to a second chamber and then through a second set of tubes and is returned to another chamber and exits through a second branch pipe disposed at an extreme end of the chamber. The structure made in accordance with the present invention exhibits a relative flow pattern between the chambers that is a counterflow, thereby improving the performance of the combustor. preferably, the tubes are grouped in plurality of pairs of tubes, and the chambers include relatively smaller chambers and relatively larger chambers. In one preferred embodiment, the combustor has an input end and a discharge end, and the relatively larger chambers are disposed at the input end and the relatively smaller chambers are disposed at the discharge end. Preferably, the headers are toroidal ring headers.

7 Claims, 5 Drawing Sheets

5,845,591

BRANCH PIPE FOR A ROTARY COMBUSTOR

The present invention relates to incineration equipment, and more particularly, relates to rotary combustors.

BACKGROUND OF THE INVENTION

Rotary combustors are often used for waste disposal and incineration. A typical example is disclosed in U.S. Pat. No. 4,840,132—Jose. A similar system is disclosed in U.S. Pat. No. 5,097,773—Freeman. The use of tube coolers in such systems is disclosed in U.S. Pat. No. 4,995,809—Filges, et al.

Rotary coolers and heat exchangers are well known. U.S. Pat. No. 3,859,039—Heinemann et al. discloses a rotary tube furnace and a planetary cooler. U.S. Pat. No. 4,131,418—Kramm et al. discloses a rotary kiln with a cooler comprised of a plurality of tubes arranged in a cylinder for effecting heat exchange with hot material inside the kiln.

U.S. Pat. No. 4,711,297—Haacker et al. also discloses a rotary tube cooler. The disclosed device transfers heat from granular material.

Rotary joints for fluid flow devices are also known. For example, U.S. Pat. No. 4,096,757—Ishii et al. discloses an ultrasonic defect detection apparatus that has a probe disposed within a hollow shaft that is inserted into a pipe that is being examined. Another such joint is disclosed in U.S. Pat. No. 4,934,744—Samera, Jr., et al., and U.S. Pat. No. 4,966,746—Richardson et al.

A rotary combustor is a device for burning municipal waste and for generating electricity using the waste heat produced by a by-product of the combustion.

However, branch pipes in current combustors are arranged such that an unequal distribution of flow through the tubes connecting the headers will occur. The flow pattern in the chambers within each header is split (bi-directional) and will cause the static pressure distribution in the tubes to be variable relative to the chambers in the opposite header, which have a uni-directional flow pattern. The coolant water will preferentially flow down the tubes which have a lower static pressure drop. The result will be a non-uniform or poor distribution of flow between the interconnecting tubes. Tubes which have a lower flow may have poor cooling and may therefore overheat and fail.

SUMMARY OF THE INVENTION

It has now been found, however, that the deficiencies of prior art rotary combustors can be overcome by providing a rotary combustor comprising a plurality of tubes connecting a first header to a second header, in which the first and second headers have a plurality of baffles dividing them into a plurality of chambers, and where a branch pipe is located at the extreme end of a first of the chambers for admitting fluid to the first chamber, such that the fluid flows through a first set of tubes to a second chamber and then through a second set of tubes and is returned to another chamber and exits through a second branch pipe disposed at an extreme end of the chamber. The structure made in accordance with the present invention exhibits a relative flow pattern between the chambers that is a counterflow, thereby improving the performance of the combustor. preferably, the tubes are grouped in plurality of pairs of tubes, and the chambers include relatively smaller chambers and relatively larger chambers. In one preferred embodiment, the combustor has an input end and a discharge end, and the relatively larger chambers are disposed at the input end and the relatively smaller chambers are disposed at the discharge end. Preferably, the headers are toroidal ring headers.

In certain preferred embodiments of the present invention, the discharge end is connected to a rotary joint that includes a coaxial pipe comprised of on an inner pipe and an outer pipe that has a plurality of apertures. Preferably, an annular baffle disposed within the inner pipe and a casing surrounds the outer pipe.

Thus, the present invention provides a rotary combustor for converting waste heat into steam, that has a pair of headers connected by a plurality of pipes in which a plurality of baffles are disposed inside the headers to define a series of chambers. In accordance with the invention, a branch pipe is connected to each chamber at a discharge end of the combustor to provide fluid communication with the interior of the chamber and the branch pipes is located at the extreme ends of the chambers, thereby causing a counterflow of coolant within the chambers of the headers. In preferred embodiments, the chambers located at the discharge end of the combustor are relatively smaller than the chambers located at an input end of the combustor.

Another aspect of the present invention is the provision of an incineration and power generation system comprising a section for combusting waste and generating excess heat, and a heat exchange section for converting the excess heat into electricity, wherein coolant water is introduced to a rotary combustor for converting waste heat into steam, the rotary combustor comprising: a pair of headers connected by a plurality of pipes in which a plurality of baffles are disposed inside the headers to define a series of chambers. In accordance with the aspect of the invention described above, a branch pipe is connected to each chamber at a discharge end of the combustor to provide fluid communication with the interior of the chamber and the branch pipes are located at the extreme ends of the chambers to create a counterflow of coolant within the chambers.

DETAILED DESCRIPTION OF PREFERRED EMBODIMENTS

Figure 1:
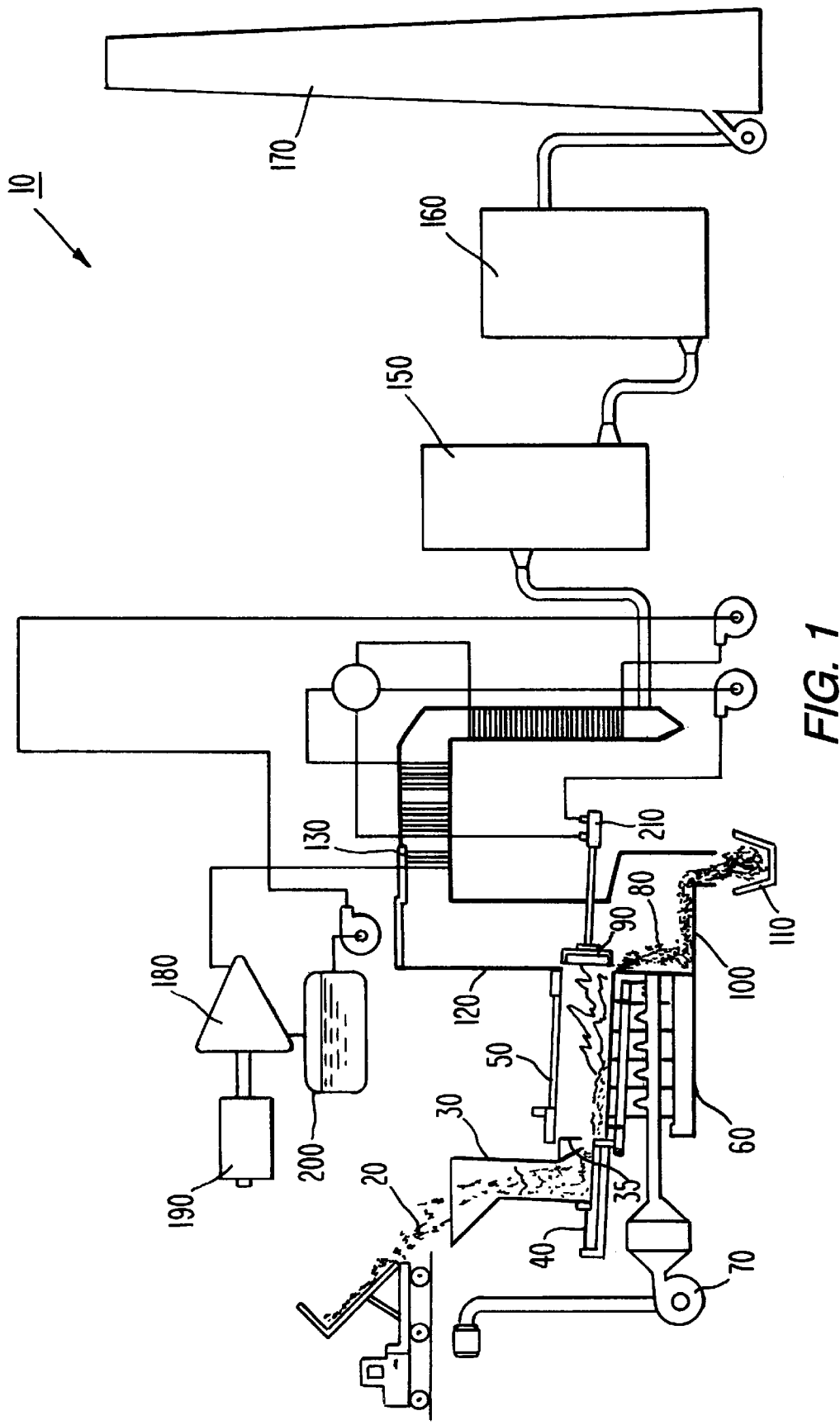
FIG. 1 is a schematic illustration of an incineration system that incorporates a rotary combustor.

FIG. 1 illustrates a rotary combustor system, with certain parts removed for clarity, an incineration system 10 as shown in FIG. 1, is generally used for burning municipal waste 20 and for converting the waste heat from incineration into electricity. A feed hopper 30 receives the municipal waste 20, which is then urged by a ram feeder 40 into an input end 35 of a combustor 50, where the waste 20 is burned. Combustion is aided by air forced through windboxes 60 and into the combustor 50, the forced air is supplied to the windboxes 60 by a fan mechanism 70. Ash and other solid byproducts 80 from the combustion flows out the discharge end 90 of the combustor 50 and on to a grate 100, which conveys the ash 80 to a conveying system 110 for removal. The system illustrated in FIG. 1. also creates electricity. Hot gases from the combustor 50 rise in the furnace 120 and communicate with a boiler bank or superheaters 130 to produce steam that is passed to a turbine 180 and generator 190 for producing electricity. The hot gases continue to travel in the furnace 120 to a dry scrubber 150, and then to a baghouse 160 for removing undesirable constituents from the gases. The gases then pass into a flue stack 170 for release into the atmosphere.

Figure 2:
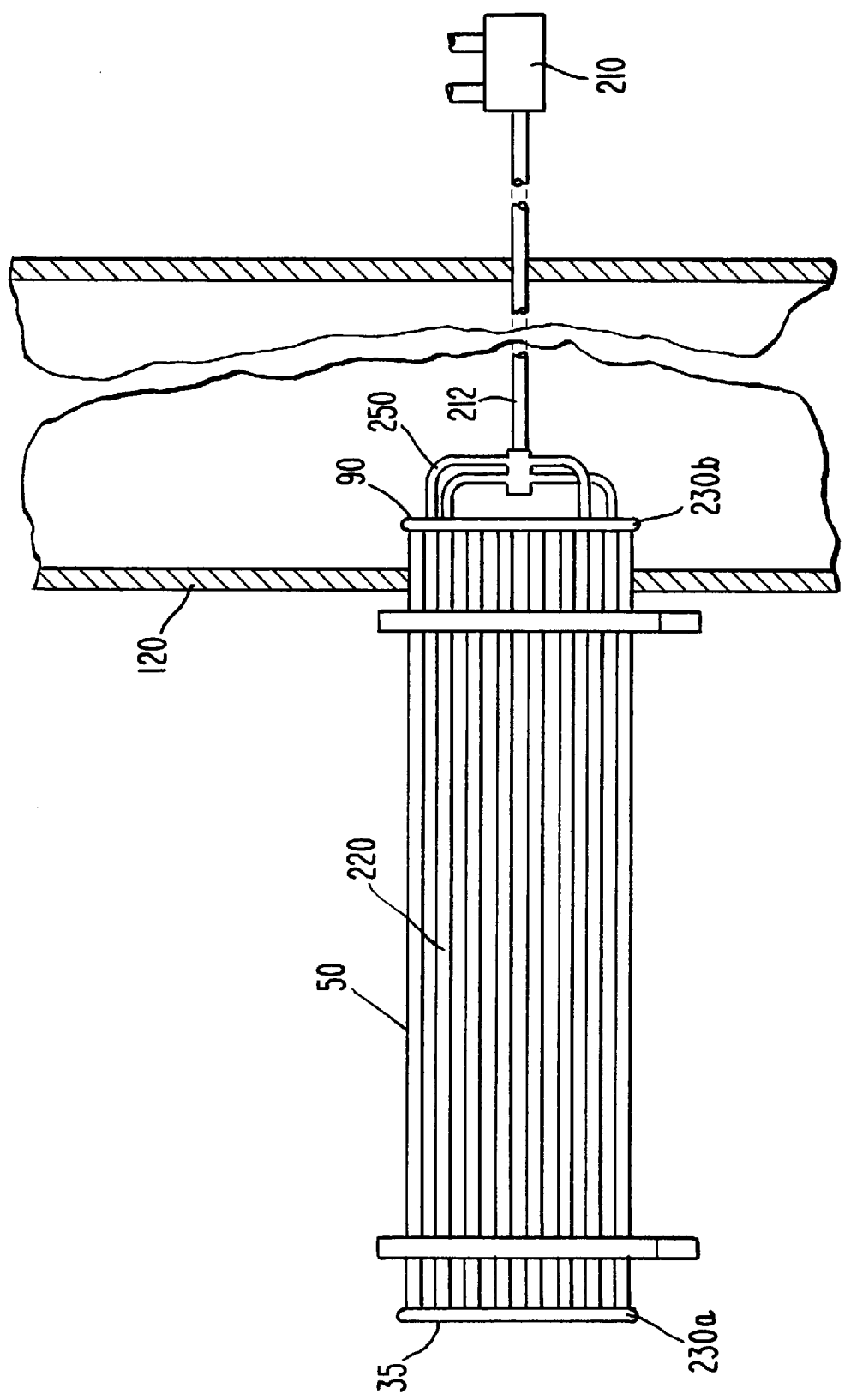
FIG. 2 is an elevation view, partially in cross-section, of a rotary combustor.
Figure 3:
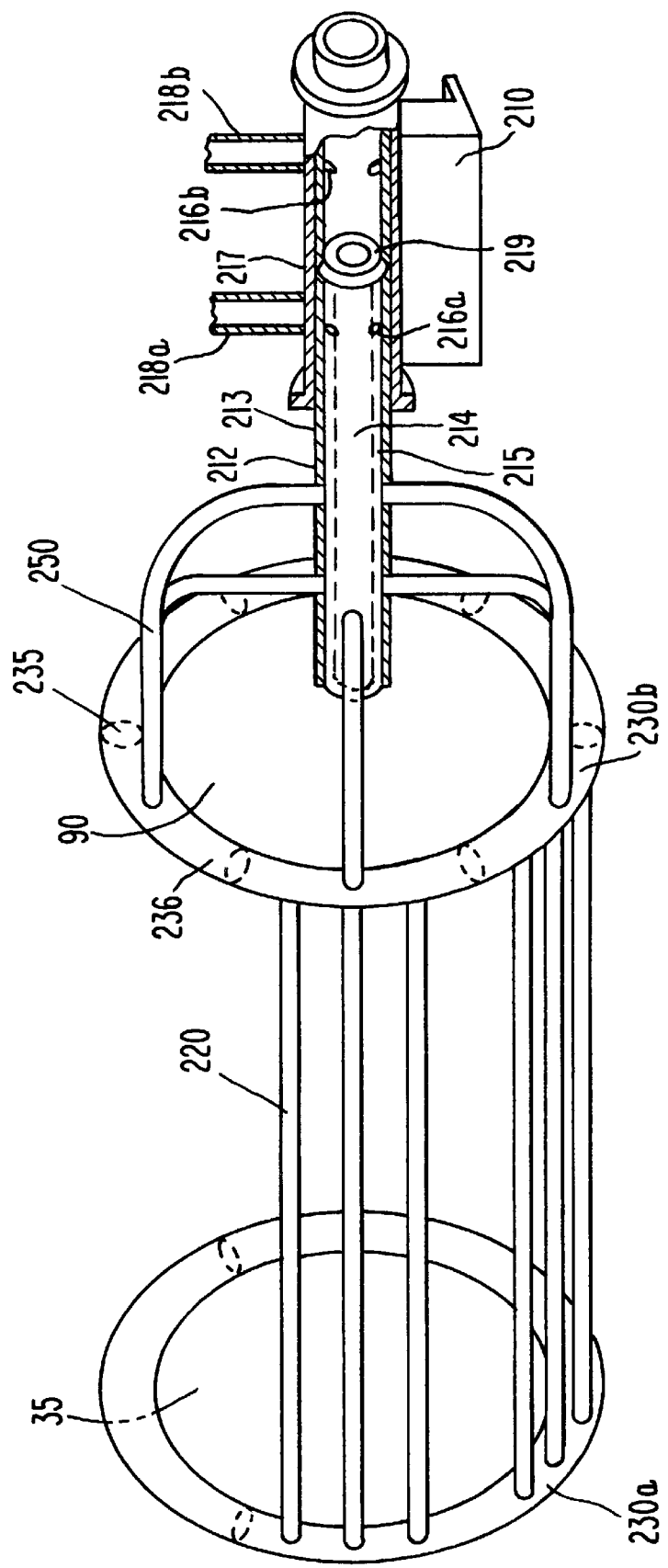
FIG. 3 is a broken away perspective view of the details of the combustor illustrated in FIG, 3.

Referring to FIGS. 2 and 3, it is seen that the combustor 50 comprises a plurality of tubes 220 for conducting the water and for returning a steam/water mixture. The input end 35 and the discharge end 90 of combustor 50 each include toroidal ring headers 230a,230b, respectively, for interconnecting tubes 220. Disposed in each ring header 230a,230b are a plurality of baffle plates 235, the details of which are set forth below. The baffle plates 235 define chambers 236 in each of the ring headers 230a,230b. As best seen in FIG. 3, a plurality of branch pipes 250 interconnect the ring header 230b and coaxial pipe 212.

Referring still to FIGS. 1–3, when the system 10 is in operation, liquid water is pumped to a rotary joint 210 that feeds the water through a coaxial pipe 212 to the combustor 50. The water is then returned to the rotary joint 210 as a water/steam mixture. In this regard, the coaxial pipe 212 is coaxial in the sense that it has an inner pipe 214 coaxially disposed in an outer pipe 213 so as to define an annular region 215 therebetween, as best seen in FIG. 3. Moreover, the outer pipe 213 has a plurality of holes 216a,216b through its circumference. An annular baffle 219 surrounds the circumference of pipe 214 and is interposed between outer pipe 213 and inner pipe 214 in order to segregate one set of holes 216a from the other set of holes 216b. Surrounding a portion of outer pipe 213 is a casing 217 having pipes 218a/218b connected thereto. Pipe 218a is in communication with the interior of outer pipe 213 while pipe 218b is in communication with the interior of inner pipe 214. It should be understood that coolant water flows through pipe 218a, holes 216a, down annular region 215, into predetermined ones of the branch pipes 250, and then into ring header 230b. The coolant water then flows through pipes 220 on its way to ring header 230a. A water/steam mixture is returned to rotary joint 210 by way of other tubes 220, whereupon the water/steam mixture enters inner pipe 214, flows through holes 216b and into pipe 218b. The previously mentioned baffles 235 that are disposed in ring headers 230a/230b ensure that the coolant feed will not mix with the water/steam mixture.

Figure 4A:
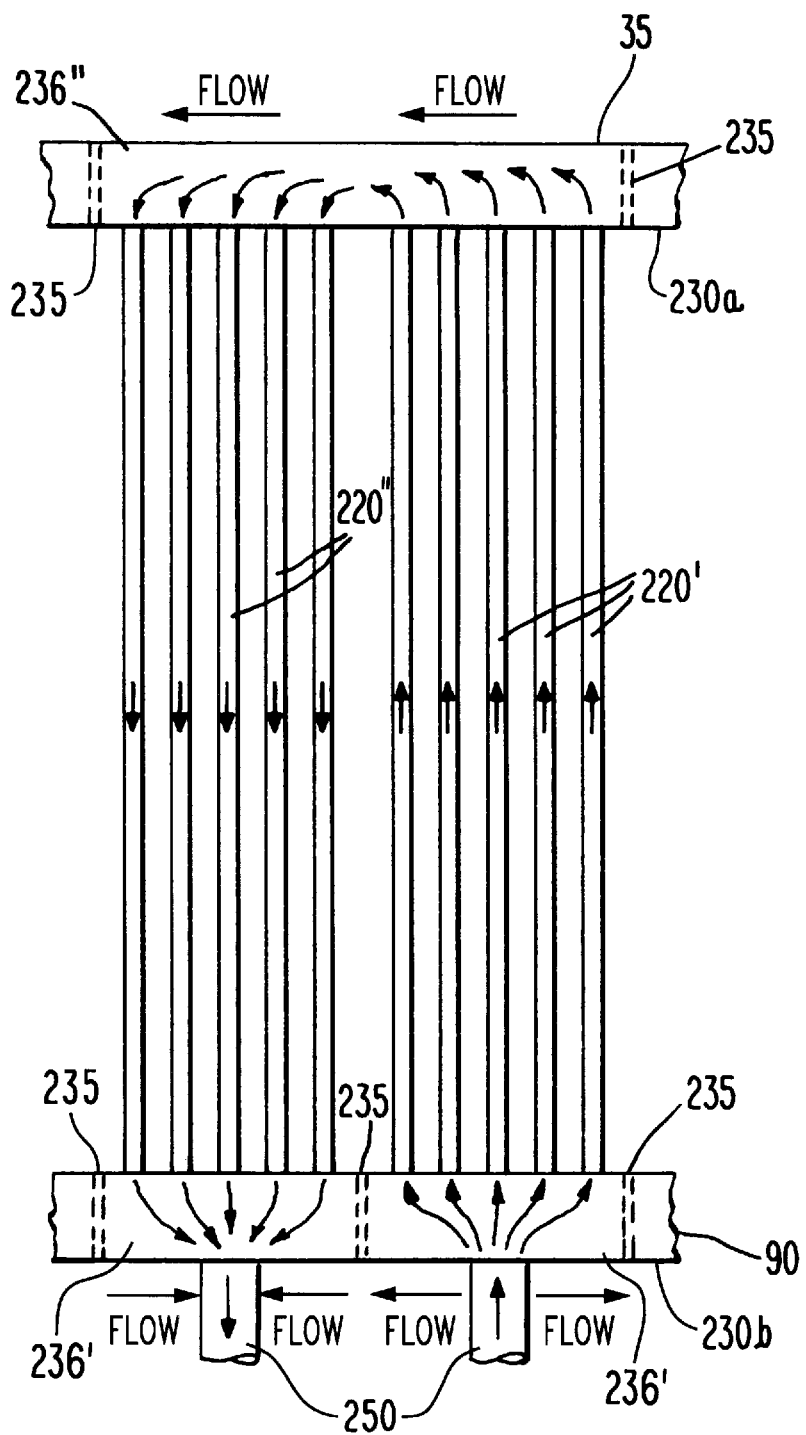
FIG. 4A illustrates the arrangement and flow patterns of the piping of prior art rotary combustors.

However, as mentioned above, the branch pipes 250 in current combustors are arranged such that an unequal distribution of flow through tubes 220 will occur from ring header 230b to ring header 230a and back to 230b, as described above and as further shown in FIG. 4A. The flow pattern in the small chambers 236' that are created between the baffle plates 235 is split (bi-directional) and will cause the static pressure distribution in the small chamber 236' to be variable relative to the larger chamber 236" which has a unidirectional flow pattern. The coolant water will preferentially flow down the tubes which have a lower static pressure drop, and the result will be a non-uniform or poor distribution of flow between the interconnecting tubes 220. Tubes 220 that have a lower flow may have poor cooling and may therefore overheat and fail.

Figure 4B:
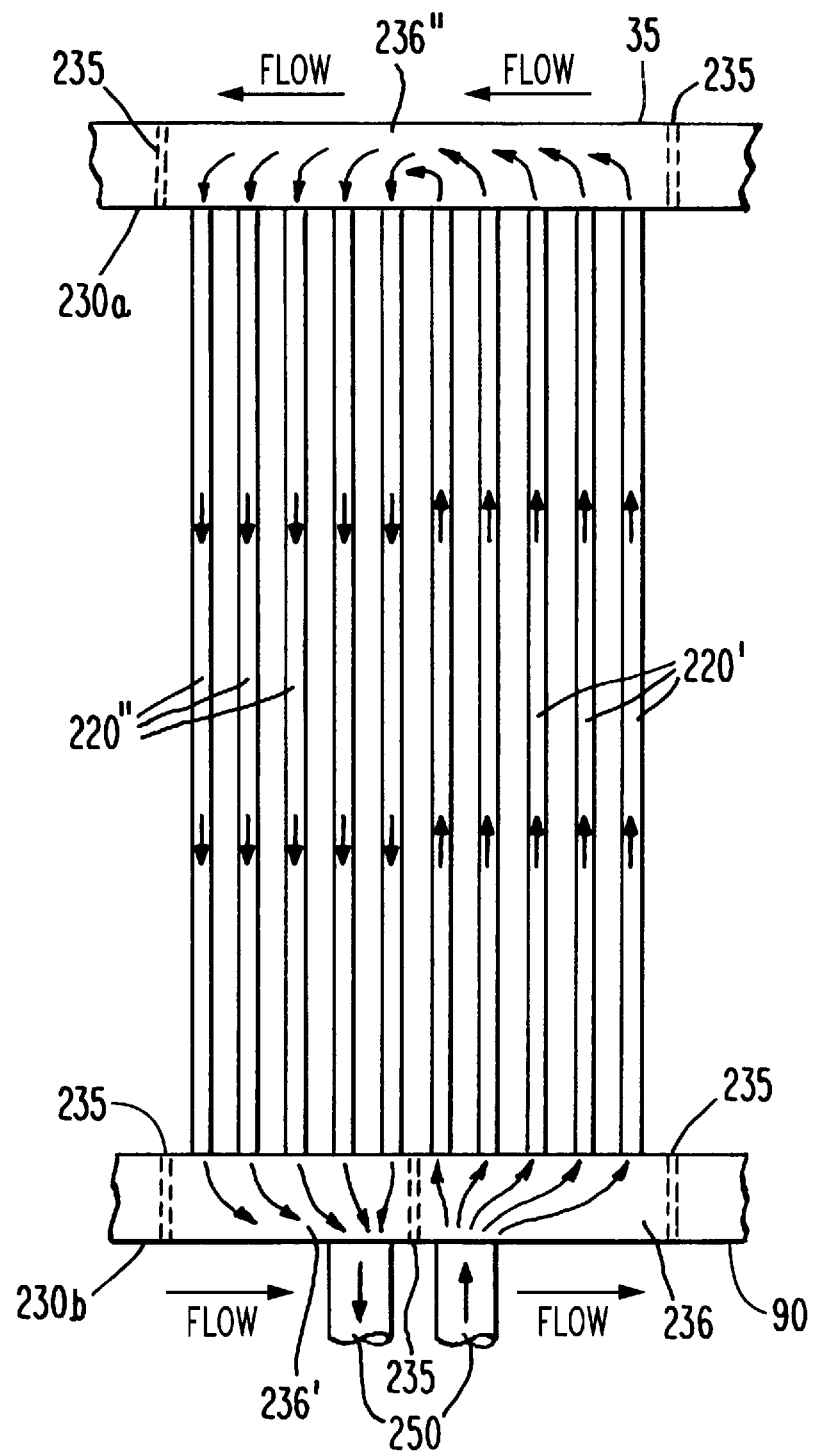
FIG. 4B illustrates the arrangement and flow patterns of the piping of a rotary combustor made in accordance with the present invention.

The present invention, however, provides a solution to this problem. One preferred embodiment of the present invention is shown in FIG. 4B. In a combustor 50 made in accordance with the present invention, coolant water is introduced into tubes 220 from the header 230b. The water flows through tubes 220 to the opposite header 230a whereupon it returns through other tubes 220 to header 230b. A set of adjacent tubes 220 communicate with the smaller chamber 236' at one end of the tubes 220, and also communicates with a larger chamber 236" at the other end of the tubes 220. The flow pattern of the fluid is shown in FIG. 4B and it can be seen that the fluid enters smaller chamber 236' by way of the branch pipe 250 located at the extreme end of the chamber, flows through a first set of tubes 220' and enters larger chamber 236" where it turns and flows through a second pair of tubes 220" on its way back to another smaller chamber 236'. The flow exits the second small chamber 236' by way of a branch pipe 250 located at the extreme end of the chamber. The relative flow pattern between the opposite chambers 236', 236" is itself opposite, i.e., a counterflow, because the branch pipes 250 are located at the extreme ends of the small chambers 236'. Thus, the present invention differs from the prior art in that the branch pipes 250 are located to cause a counterflow of coolant within the chambers of the ring headers 230a,230b.

A rotary combustor 50 made in accordance with the present invention will present numerous advantages over those found in the prior art. The counterflow created in combustors made in accordance with the present invention causes a more balanced and uniform pressure drop to occur between the set of tubes connecting chamber 236' with 236". In this manner, the flow is more equally divided and uniform among the set of tubes and all tubes are assured of the necessary flow to keep them cooled.

Although the invention has been described in terms of an exemplary embodiment, the spirit and scope of the appended claims are not to be limited by any details not expressly stated in the claims. Upon review of the foregoing, numerous alternative embodiments will present themselves to those of skill in the art. Accordingly, reference should be made to the appended claims in order to determine the full scope of the present invention.

What is claimed is:

1. A combustor for incinerating wastes, comprising:

a) first and second headers;

b) a plurality of heat transfer tubes for conveying a fluid, said tubes extending between said first and second headers, a first portion of said tubes having an inlet connected to said first header and an outlet connected to said second header, a second portion of said tubes having an inlet connected to said second header and an outlet connected to said first header;

c) a baffle disposed in said first header, said baffle having first and second sides and dividing said first header into first and second chambers;

d) a supply pipe for supplying said fluid to said first header for flow through said tubes, said supply pipe connected to said first chamber at a location immediately adjacent said first side of said baffle, whereby said fluid flows generally in a first direction through said first chamber; and e) a discharge pipe for discharging said fluid that has flowed through said tubes from said first header, said discharge pipe connected to said second chamber at a location immediately adjacent said second side of said baffle, whereby said fluid flows generally in said first direction through said second chamber so that said fluid flow through said first and second chambers is generally in substantially the same direction.

2. The combustor according to claim 1, wherein said first and second portions of said tubes are connected to said second header so as to cause said fluid to generally flow through said second header in a second direction, said second direction being substantially opposite to said first direction in which said fluid generally flows through said first and second chambers of said first header.

3. The combustor according to claim 2, wherein said first and second headers are toroidal, and wherein said first direction in which said fluid generally flows through said first and second chambers of said first header is clockwise and said second direction in which said fluid generally flows through said second header is counterclockwise.

4. The combustor according to claim 1, wherein said combustor is a rotary combustor, and wherein said supply and discharge pipes are in flow communication with a rotary joint.

5. A rotary combustor for incinerating wastes, comprising:
   a) a plurality of headers forming first, second and third chambers;
   b) a plurality of heat transfer tubes for conveying a fluid, a first portion of said tubes extending between said first and third chambers, a second portion of said tubes extending between said second and third chambers;
   c) means for causing said fluid to flow through said first chamber and then through said first portion of said tubes and then through said third chamber and then through said second portion of said tubes and then through said second chamber; and
   d) fluid flow directing means for causing said fluid to generally flow through said first and second chambers in substantially the same direction.

6. The combustor according to claim 5, wherein at least said first and second chambers are arcuate and have lengths in the circumferential direction, said first and second arcuate chambers each having first and second opposing ends, said first and second ends defining therebetween said circumferential lengths of said chambers, said first end of said first chamber being displaced adjacent said second end of said second chamber, and wherein said fluid flow directing means comprises (i) a supply pipe for supplying said fluid to said first chamber, said supply pipe connected to said first chamber at a location adjacent said first end thereof, and (ii) a discharge pipe for discharging said fluid from said second chamber, said discharge pipe connected to said second chamber at a location adjacent said second end thereof.

7. The combustor according to claim 5, further comprising means for causing said fluid to generally flow through said third chamber in a direction substantially opposite to the direction in which said fluid generally flows through said first and second chambers.

* * * * *